United States Patent
Tang

(10) Patent No.: US 10,416,494 B2
(45) Date of Patent: Sep. 17, 2019

(54) BLUE-PHASE LIQUID CRYSTAL DEVICES, BLUE-PHASE LIQUID CRYSTAL DISPLAY MODULES, AND THE MANUFACTURING METHODS THEREOF

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventor: Yuejun Tang, Guangdong (CN)

(73) Assignees: Shenzhen China Star Optoelectronics Technology Co., Ltd., Shenzhen, Guangdong (CN); Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 203 days.

(21) Appl. No.: 14/894,356

(22) PCT Filed: Oct. 27, 2015

(86) PCT No.: PCT/CN2015/092917
§ 371 (c)(1),
(2) Date: Nov. 26, 2015

(87) PCT Pub. No.: WO2017/067011
PCT Pub. Date: Apr. 27, 2017

(65) Prior Publication Data
US 2017/0192261 A1    Jul. 6, 2017

(30) Foreign Application Priority Data
Oct. 20, 2015  (CN) .......................... 2015 1 0685236

(51) Int. Cl.
G02F 1/1335    (2006.01)
G02F 1/1343    (2006.01)
(Continued)

(52) U.S. Cl.
CPC ........ *G02F 1/133555* (2013.01); *G02F 1/137* (2013.01); *G02F 1/1333* (2013.01);
(Continued)

(58) Field of Classification Search
CPC . G02F 1/1343; G02F 1/1362; G02F 1/133555
See application file for complete search history.

(56) References Cited

U.S. PATENT DOCUMENTS 7,064,802 B2 *   6/2006   Lin ................... G02F 1/133555
                                                          349/113
7,864,274 B2 *   1/2011   Nagai ............... G02F 1/133528
                                                          349/114
(Continued)

FOREIGN PATENT DOCUMENTS

CN          102789104       * 10/2014

*Primary Examiner* — Dung T Nguyen
(74) *Attorney, Agent, or Firm* — Andrew C. Cheng

(57) ABSTRACT

A blue-phase liquid crystal display module, a blue-phase LCD, and the manufacturing method are disclosed. The blue-phase liquid crystal display module includes an up substrate, a down substrate and blue-phase liquid crystals. The down substrate is opposite to the up substrate, and the blue-phase liquid crystals are arranged between the up substrate and the down substrate. The pixel electrodes and the common electrodes are alternately arranged on the down substrate, and the pixel electrodes and the common electrodes are spaced apart from each other. Electrical fields are formed between the pixel electrodes and the common electrodes to drive the blue-phase liquid crystals. The blue-phase liquid crystal display module may form a plurality of IPS electrical fields such that the driving voltage of the blue-phase liquid crystals may be effectively reduced.

16 Claims, 5 Drawing Sheets

(51) Int. Cl.
*G02F 1/1333* (2006.01)
*G02F 1/13357* (2006.01)
*G02F 1/137* (2006.01)

(52) U.S. Cl.
CPC ...... *G02F 1/1336* (2013.01); *G02F 1/134363* (2013.01); *G02F 1/13439* (2013.01); *G02F 2001/13793* (2013.01); *G02F 2001/133354* (2013.01); *G02F 2001/133624* (2013.01)

(56) References Cited

U.S. PATENT DOCUMENTS

| | | | |
|---|---|---|---|
| 8,848,156 B2 * | 9/2014 | Lee | G02F 1/134309 349/138 |
| 2006/0092363 A1 * | 5/2006 | Hasegawa | G02F 1/133555 349/141 |

* cited by examiner

BLUE-PHASE LIQUID CRYSTAL DEVICES, BLUE-PHASE LIQUID CRYSTAL DISPLAY MODULES, AND THE MANUFACTURING METHODS THEREOF

BACKGROUND OF THE INVENTION

1. Field of the Invention

The present disclosure relates to liquid crystal display technology, and more particularly to a blue-phase liquid crystal display module, a blue-phase liquid crystal device (LCD), and the manufacturing method thereof.

2. Discussion of the Related Art

Compared to the conventional liquid crystal materials, the blue-phase liquid crystals are characterized by four attributes as below. First, the response time of the blue-phase liquid crystals is within sub-millisecond, and the blue-phase liquid crystals may be driven at 240 Hz without adopting Over Drive technology. As such, the dynamic blur issue of motional images may be effectively decreased. When RGB-LED is adopted as a backlight source. The field sequential color timing display may be achieved by the blue-phase liquid crystals without the color filter film. Second, the alignment layer, which is necessary for other display modes, is not needed for blue-phase liquid crystals. Third, The blue-phase liquid crystals are optical isotropy, which results in a wide viewing angle and a better dark state. Fourth, the impact caused by the thickness of the liquid crystal cell toward the transmission rate may be ignored if the thickness of the liquid crystal cell is larger than the transmission depth of the electrical field. This attribute is appropriate for large-scale panel or single-late LCD.

Nevertheless, the driving voltage of the blue-phase liquid crystals are too huge. Usually, the blue-phase liquid crystals with enhanced performance, such as material having large Kerr's constant, may be adopted, but a plurality of factors, such as monomer, photo initiator, and synthesis conditions have to be considered when the materials are composited. Thus, the cost of adopting enhanced blue-phase liquid crystal is really high. In addition, an enhanced electrode structure may be adopted. In view of the driving method of the IPS structure, the transmission depth of the lateral electrical field generated by the parallel electrodes is limited, and the electrical field has to be increased due to a larger driving voltage is needed. Thus, the IPS driving method for the blue-phase liquid crystals has to be enhanced.

SUMMARY

The object of the invention is to provide a blue-phase liquid crystal display module, a blue-phase LCD, and the manufacturing method thereof, which are capable of solving a large driving voltage issue of the blue-phase liquid crystals of the conventional blue-phase LCD.

In one aspect, a blue-phase liquid crystal display module includes an up substrate, a down substrate opposite to the up substrate; blue-phase liquid crystals arranged between the up substrate and the down substrate, pixel electrodes and common electrodes are alternately arranged on the down substrate, and the pixel electrodes and the common electrodes are spaced apart from each other, and electrical fields are formed between the pixel electrodes and the common electrodes to drive the blue-phase liquid crystals.

Wherein the pixel electrodes are of a dual-layers structure on the down substrate, and the two adjacent pixel electrode layers are spaced apart from each other via the insulation layer; and the common electrodes are of the dual-layers structure on the down substrate, and the two adjacent common electrode layers are spaced apart from each other via the insulation layer.

Wherein the pixel electrodes are of a dual-layers structure comprising a first layer on an up surface of the down substrate and a second layer spaced apart from the first layer via the insulation layer; and the common electrode are of the dual-layers structure comprising a first layer on the up surface of the down substrate and a second layer spaced apart from the first layer via the insulation layer.

Wherein a height of the second layer of the pixel electrode and the height of the second layer of the common electrode with respect to the down substrate are the same, and the second layers of the pixel electrode and the common electrode are on the same plane.

Wherein the down substrate comprises a reflective layer dividing the display module into a transmission area and a reflective area.

Wherein the pixel electrodes are of a layer-stack structure on the down substrate, and the two adjacent pixel electrode layers are spaced apart from each other via the insulation layer; and the common electrodes are of the layer-stack structure on the down substrate, and the two adjacent common electrode layers are spaced apart from each other via the insulation layer.

Wherein the pixel electrodes and the common electrodes within the transmission area are of a dual-layers structure, a first layer is arranged on the down substrate via the insulation layer, and the second layer is spaced apart from the first layer via the insulation layer, and first layers of the pixel electrode and the common electrode are on the same plane, second layers of the pixel electrode and the common electrode are on the same plane; and the pixel electrode and the common electrode within the reflective area are of a single-layer structure Wherein the pixel electrode and the common electrode within the reflective area are on the same layer with first layers or second layers of the pixel electrode and the common electrode within the transmission area.

In one aspect, a blue-phase LCD including the above blue-phase liquid crystal display module is provided.

In one aspect, a manufacturing method of blue-phase liquid crystal display modules includes: forming a first electrode layer on a down substrate; forming an insulation layer on the first electrode layer; forming a second electrode layer on the insulation layer; arranging a masking plate comprising a plurality of parallel slots on the second electrode layer; radiating the masking plate by unidirectional ultraviolet (UV) rays to form a gap between a pixel electrode and a common electrode via an etching process; and filling in blue-phase liquid crystal and closing the up substrate.

Wherein the insulation layer are made by transparent materials.

In view of the above, the blue-phase liquid crystal display module, a blue-phase LCD, and the manufacturing method may form a plurality of IPS electrical fields to effectively reduce the driving voltage of the blue-phase liquid crystals.

BRIEF DESCRIPTION OF THE DRAWINGS

In order to more clearly illustrate the embodiments, the following figures relate to simple examples regarding some of the embodiments. For those of ordinary skill in terms of creative effort without precondition, other drawings may be obtained based on the drawings provided.

DETAILED DESCRIPTION OF THE EMBODIMENTS

Embodiments of the invention will now be described more fully hereinafter with reference to the accompanying drawings, in which embodiments of the invention are shown.

Figure 1:
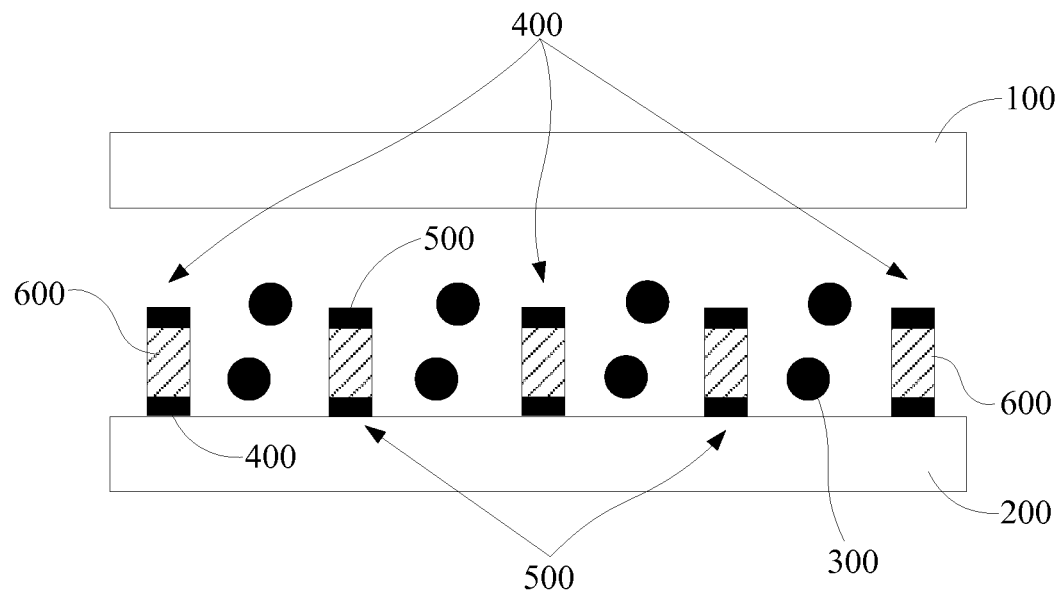
FIG. 1 is a cross-sectional view of the blue-phase liquid crystal display module in accordance with one embodiment.

FIG. 1 is a cross-sectional view of the blue-phase liquid crystal display module in accordance with one embodiment. The blue-phase liquid crystal display module includes, but not limited to, an up substrate 100, a down substrate 200, blue-phase liquid crystals 300, and a plurality of common electrodes 500 and a pixel electrodes 400 between the up substrate 100 and the down substrate 200.

Specifically, the down substrate 200 is opposite to the up substrate 100. The blue-phase liquid crystals 300 are arranged between the up substrate 100 and the down substrate 200. The pixel electrodes 400 and the common electrodes 500 are arranged on the down substrate 200. The pixel electrodes 400 and the common electrodes 500 are spaced apart from each other and are arranged in an alternated manner. The electrical field is formed between the pixel electrodes 400 and the common electrodes 500 for driving the blue-phase liquid crystals 300.

Figure 2:
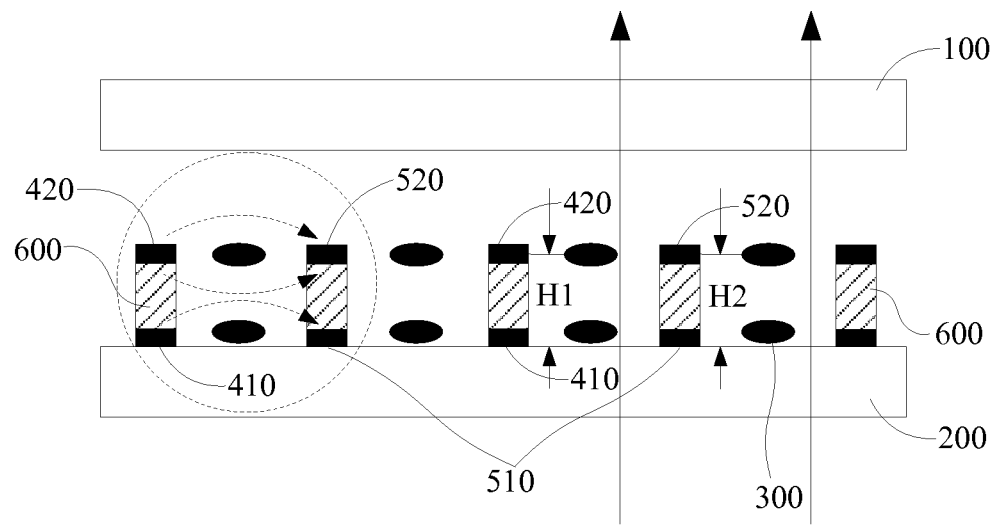
FIG. 2 is a cross-sectional view of the blue-phase liquid crystal display module of FIG. 1 when being electrified.

FIG. 2 is a cross-sectional view of the blue-phase liquid crystal display module of FIG. 1 when being electrified. In the embodiment, the pixel electrodes 400 having a layer-stack structure are arranged on the down substrate 200. An insulation layer 600 is arranged between two adjacent pixel electrodes 400. The common electrodes 500 having the layer-stack structure are arranged on the down substrate 200. The insulation layer 600 is arranged between two adjacent common electrodes 500. In the embodiment, the pixel electrodes 400 is of a dual-layers structure including a first pixel electrode layer 410 and a second pixel electrode layer 420. The first pixel electrode layer 410 is arranged above an up surface of the down substrate 200. The second pixel electrode layer 420 is spaced apart from the first pixel electrode layer 410 via the insulation layer 600. Similarly, the common electrodes 500 are also of the dual-layers structure having a first common electrode layer 510 and a second common electrode layer 520. The first common electrode layer 510 is arranged on the up surface of the down substrate 200, and the second common electrode layer 520 is spaced apart from the first common electrode layer 510 via the insulation layer 600. The insulation layer 600 may be made by transparent materials, such as transparent photoresist glue, SiNx, SiOx, or Over coating (OC).

The second layers of the pixel electrodes 400 and the common electrodes 500 are at the same altitude with respect to the down substrate 200. Referring to FIG. 2, the height of the first pixel electrode layer 410 of the pixel electrodes 400 with respect to the down substrate 200 is H1, the height of the first common electrode layer 510 of the common electrodes 500 with respect to the down substrate 200 is H2. Preferably, H1=H2. That is, the second layers of the pixel electrodes 400 and the common electrodes 500 are at the same plane.

Referring to FIG. 2, the electrical field is shown by the area formed by the dashed lines. The two second electrode layers at the same layer form IPS electrical field. In addition, two IPS electrical fields are formed between the up surface and the down surface of the electrodes and between the pixel electrode and the common electrode at the same layer. In addition, the IPS electrical field is formed between the up surfaces of the first electrode layers at the same layer. That is, the electrode structure as shown may form three horizontal IPS electrical field for driving the blue-phase liquid crystals. Compared to the conventional blue-phase liquid crystals driven by the pixel electrode and the common electrode respectively formed on the up and the down substrate, the electrode structure may effectively reduce the driving voltage of the blue-phase liquid crystals.

In the embodiment, the rectangular protrusions are configured with the blue-phase liquid crystal display module, and the up layer and the down layer of the rectangular protrusions are provided with the electrode layers. Preferably, the same electrodes are arranged at the up layer and the down layer of the same protrusions, which may be the pixel electrode or the common electrode. The common electrode and the pixel electrode are spaced apart from each other. The IPS electrical field is formed between the electrodes on the second electrode layer, and two IPS electrical fields are respectively formed at the up and the down surfaces between the electrodes arranged at the up layer, i.e., the pixel electrode and the common electrode. The IPS electrical field is formed on the up surface of the electrode at the down layer, i.e., the first electrode layer. Compared to the conventional structure, the electrode structure is capable of forming three IPS electrical fields to drive the blue-phase liquid crystals to effectively reduce the driving voltage of the blue-phase liquid crystals.

Figure 3:
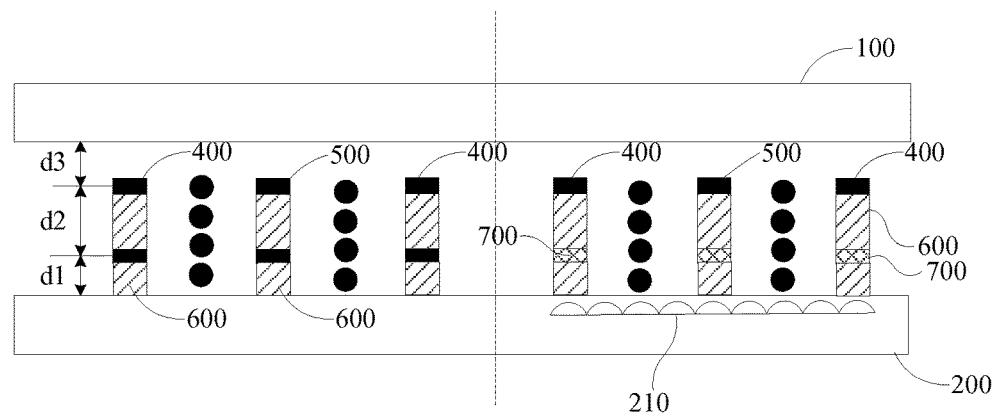
FIG. 3 is a cross-sectional view of the blue-phase liquid crystal display module in accordance with a second embodiment.

FIG. 3 is a cross-sectional view of the blue-phase liquid crystal display module in accordance with a second embodiment. In the embodiment, a reflective layer 210 is arranged on the down substrate 200 to divide the display module into a transmission area and a reflective area. The transmission area is at the left side of the dashed line, and the reflective area is at the right side of the dashed line. Within the transmission area, both of the pixel electrodes 400 and the common electrodes 500 are of dual-layers structure. The first layer is arranged on the down substrate 200 via the insulation layer 600, and the second layer is spaced apart from the first layer via the insulation layer 600.

Preferably, the first layers of the pixel electrodes 400 and the common electrodes 500 are on the same plane, and the second layers of the pixel electrodes 400 and the common electrodes 500 are on the same plane. Within the reflective area, the pixel electrodes 400 and the common electrodes 500 are of single-layer structure. In the embodiment, the pixel electrodes 400 and the common electrodes 500 within the reflective area are at the same plane with the second layers, i.e., the top layer, of the pixel electrodes 400 and the common electrodes 500 within the transmission area.

During the manufacturing process of the electrode, in order to form the electrode structure within the transmission area and the reflective area at the same time, the manufacturing method is simplified. When the first layer of electrode within the transmission area is formed, the abandoned electrode layer 700 within the reflective area is also formed. When the LCD is under operation, the layer may be the abandoned electrode layer at which the signals are not transmitted.

Figure 4:
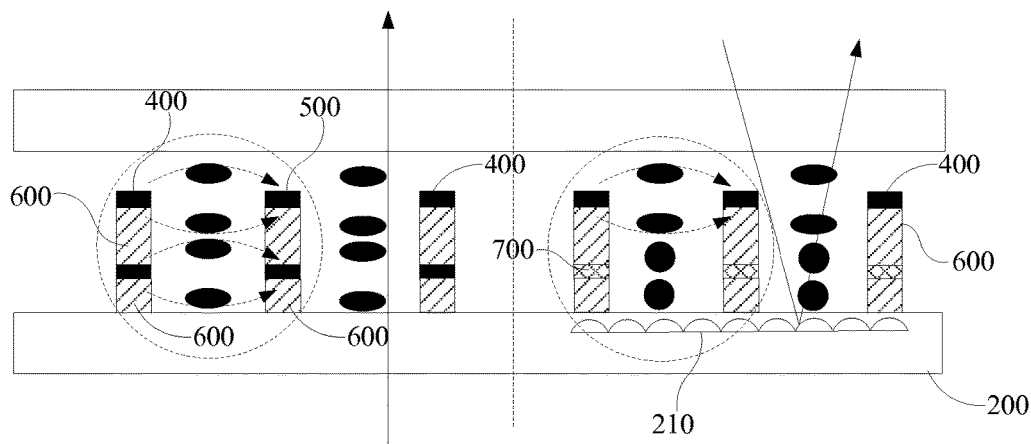
FIG. 4 is a cross-sectional view of the blue-phase liquid crystal display module of FIG. 3 when being electrified.
Figure 5:
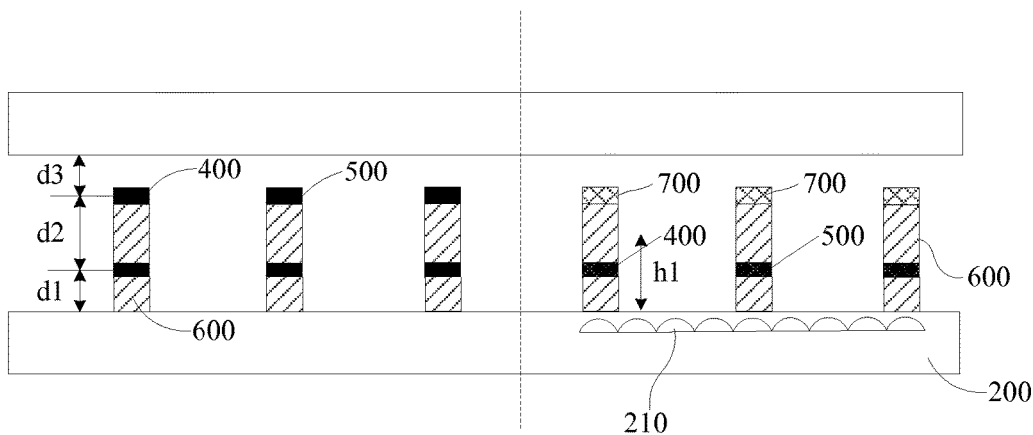
FIG. 5 is a cross-sectional view of the abandoned electrode layer arranged on a top of the liquid crystal display module in accordance with one embodiment.

FIG. 4 is a cross-sectional view of the blue-phase liquid crystal display module of FIG. 3 when being electrified. The electrical signals are not applied to the abandoned electrode layer 700 within the reflective area. When the same signals are applied to the transmission area and the reflective area, the blue-phase LCD is in a bright state. As shown in FIG. 4, the dashed circle indicates that there are four IPS electrical fields formed on the up and down surfaces of the electrodes within the transmission area of the blue-phase LCD. Thus, the strength of the electrical fields within the transmission area may be four times of that of the conventional IPS electrical field. At the same time, the strength of the electrical fields within the reflective area may be as double as that of the conventional IPS electrical field. The signals are not applied to one layer of the dual-layers electrode within the reflective area, that is, the abandoned electrode. FIG. 5 is a cross-sectional view of the abandoned electrode layer arranged on a top of the liquid crystal display module in accordance with one embodiment. The difference between the embodiment and the previous embodiment resides in that, in the previous embodiment, the abandoned electrode layer 700 is the top-layer electrode.

The height of the first electrode layer with respect to the down substrate 200, the distance between the first electrode layer and the second electrode layer, and the height of the second electrode layer with respect to the up substrate 100 are respectively defined as d1, d2, and d3. The d1, d2, d3 may be adjusted such that the thickness of the optical anisotropy within the transmission area formed under the electrical field may be as double as that within the reflective area. As such, when the same signals are applied to the reflective area and the transmission area, consistent optical anisotropy may be obtained.

The testing panels having different predetermined d1, d2, and d3 may be manufactured. Preferably, the values may be selected in ranges around 2d1=d2=2d3 and d1+d2+d3=2h1. The h1 in the drawing relates to a thickness of the cell, which results in that the effective range of the top of the electrode within the transmission area is approximately in a middle position of d2. In addition, the blue-phase liquid crystals are filled within the testing panels. The relationship between the voltage and transmission rate (V-T) of the transmission area and the reflective area of the testing panels may be represented by characteristic curves. If the tolerance range of the characteristic curves of the transmission area and the reflective area of the testing panel is consistent, the phase delay amount of the transmission area is substantially double than that of the reflective area. As such, the above relationship of the testing panel may be the reference values in real production. The altitude of the insulation layer of the protrusion and the distance between the protrusion and the up substrate may be controlled such that the effective phase delay amount of the transmission area is as double as that of the reflective area so as to obtain consistent optoelectronics when the same signals are applied to the transmission area and the reflective area.

Figure 6:
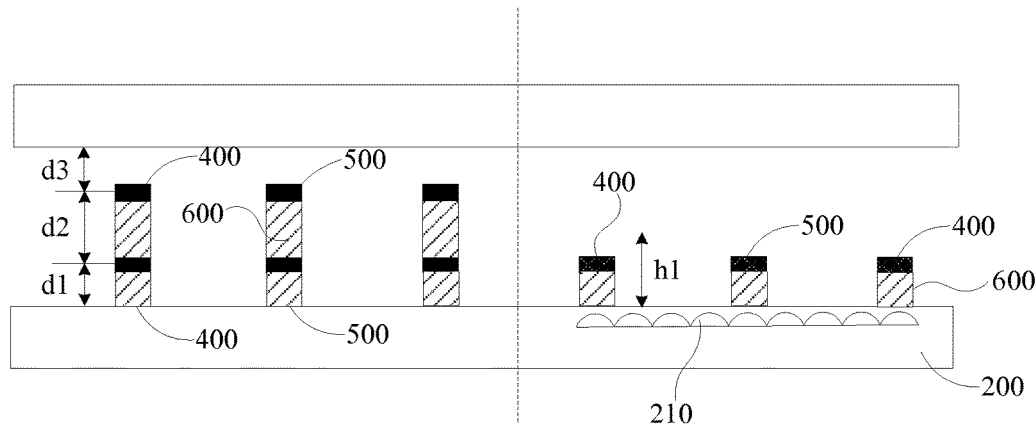
FIG. 6 is a cross-sectional view of the blue-phase liquid crystal display module in accordance with a third embodiment.
Figure 7:
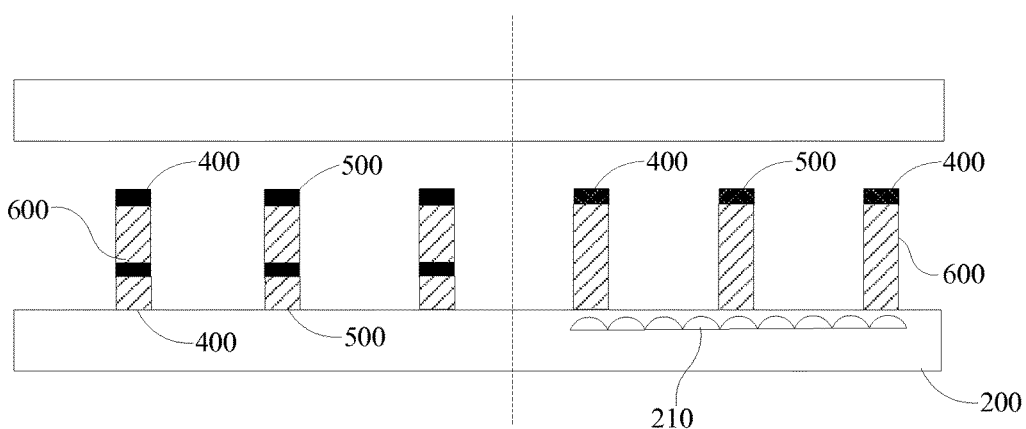
FIG. 7 is a cross-sectional view of one transformed embodiment of the third embodiment.

FIG. 6 is a cross-sectional view of the blue-phase liquid crystal display module in accordance with a third embodiment. FIG. 7 is a cross-sectional view of one transformed embodiment of the third embodiment. In the previous embodiment, the signals are not transmitted to the abandoned electrode layer, which may affect display performance due to capacitance coupling effect. Thus, in this embodiment, the abandoned electrode layer is not manufactured. The pixel electrodes 400 and the common electrodes 500 within the reflective area connects to the down substrate 200 via the insulation layer 600 directly.

Preferably, the pixel electrodes 400 and the common electrodes 500 within the reflective area may be at the same plane with the first electrode layer or the second electrode layer of the pixel electrode and the common electrode within the transmission area. Thus, FIGS. 6 and 7 have shown two possible configurations. The electrode layer is pretty thin when compared to the insulation layer, and thus the defects of the electrode layer has slight impact toward the height of the reflective area. Thus, in FIG. 7, the pixel electrodes 400 and the common electrodes 500 within the reflective area and the second electrode layers of the pixel electrodes 400 and the pixel electrodes 400 within the transmission area may be viewed as on the same plane.

As shown in FIG. 6, the reflective layer 210 is arranged within the down substrate 200 to divide the display module to the transmission area and the reflective area. The transmission area is at the left side of the dashed line, and the reflective area is at the right side of the dashed line. The pixel electrodes 400 and the common electrodes 500 are of dual-layers structure. The first layer is arranged on the down substrate 200 via the 600 via the 600, and the second layer is spaced apart from the first layer via the insulation layer 600. The insulation layer 600 may be made by transparent materials, such as transparent photoresist glue, SiNx, SiOx, or Over coating (OC).

Preferably, the first layers of the pixel electrodes 400 and the common electrodes 500 within the transmission area are on the same plane, and the second layers of the pixel electrodes 400 and the common electrodes 500 are on the same plane. The pixel electrodes 400 and the common electrodes 500 within the reflective area are of single-layer structure. In the embodiment, the pixel electrodes 400 and the common electrodes 500 within the reflective area and the first layer (middle layer) of the pixel electrodes 400 and the common electrodes 500 within the transmission area are at the same plane.

Figure 8:
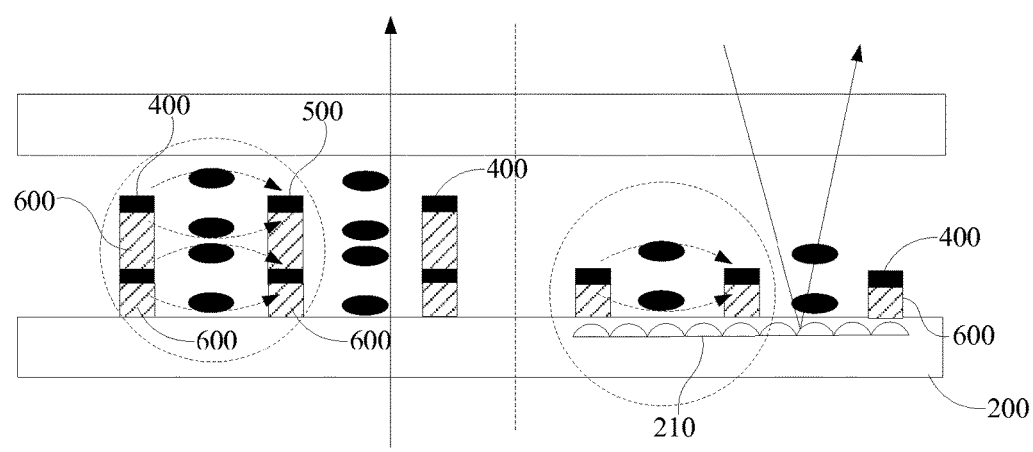
FIG. 8 is a cross-sectional view of the blue-phase liquid crystal display module of FIG. 6 when being electrified.

FIG. 8 is a cross-sectional view of the blue-phase liquid crystal display module of FIG. 6 when being electrified. The dashed circle has shown four IPS electrical fields formed between the up and down surfaces of the electrode. Thus, the strength of the electrical fields within the transmission area may be four times of that of the conventional IPS electrical field. At the same time, the strength of the electrical fields within the reflective area may be as double as that of the conventional IPS electrical field. As such, the driving voltage of the blue-phase LCD can be effectively reduced.

The height of the first electrode layer with respect to the down substrate 200, the distance between the first electrode layer and the second electrode layer, and the height of the second electrode layer with respect to the up substrate 100 are respectively defined as d1, d2, and d3. The d1, d2, d3 may be adjusted such that the thickness of the optical anisotropy within the transmission area formed under the electrical field may be as double as that within the reflective area. As such, when the same signals are applied to the reflective area and the transmission area, consistent optical anisotropy may be obtained.

The testing panels having different predetermined d1, d2, and d3 may be manufactured. Preferably, the values may be selected in ranges around 2d1=d2=2d3 and d1+d2+d3=2h1. The h1 in the drawing relates to a thickness of the cell, which results in that the effective range of the top of the electrode within the transmission area is approximately in a middle position of d2. In addition, the blue-phase liquid crystals are filled within the testing panels. The relationship between the voltage and transmission rate (V-T) of the transmission area and the reflective area of the testing panels may be represented by characteristic curves. If the tolerance range of the characteristic curves of the transmission area and the reflective area of the testing panel is consistent, the phase delay amount of the transmission area is substantially double than that of the reflective area. As such, the above relationship of the testing panel may be the reference values in real production. The altitude of the insulation layer of the protrusion and the distance between the protrusion and the up substrate may be controlled such that the effective phase delay amount of the transmission area is as double as that of the reflective area so as to obtain consistent optoelectronics when the same signals are applied to the transmission area and the reflective area.

As shown in FIG. 7, the common electrode and the pixel electrode within the reflective area are on the same plane with the top electrode within the transmission area. The characteristics of other components may be referred to the embodiment in FIG. 6, and thus are omitted hereinafter.

Figure 9:
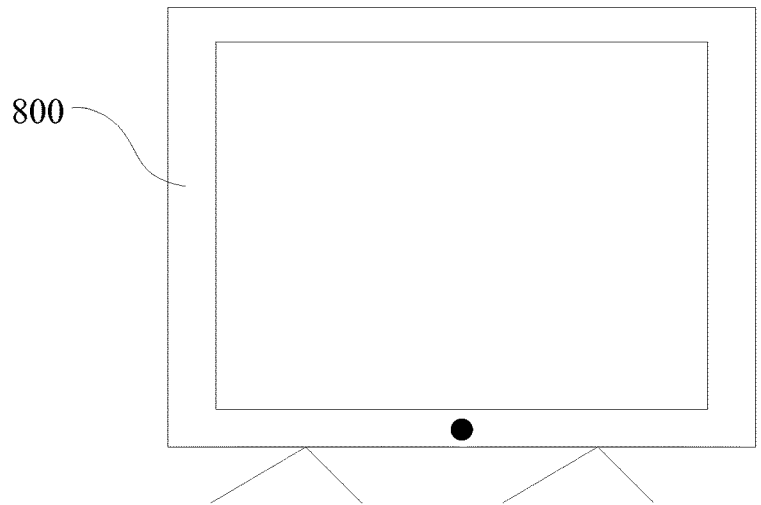
FIG. 9 is a schematic view of the blue-phase LCD in accordance with one embodiment.

FIG. 9 is a schematic view of the blue-phase LCD in accordance with one embodiment. The blue-phase LCD includes the above blue-phase liquid crystal display module. The blue-phase LCD may include a housing 800 and components such as a control circuit (not shown), which may be conceived by persons ordinary in the art and thus are omitted hereinafter.

Figure 10:
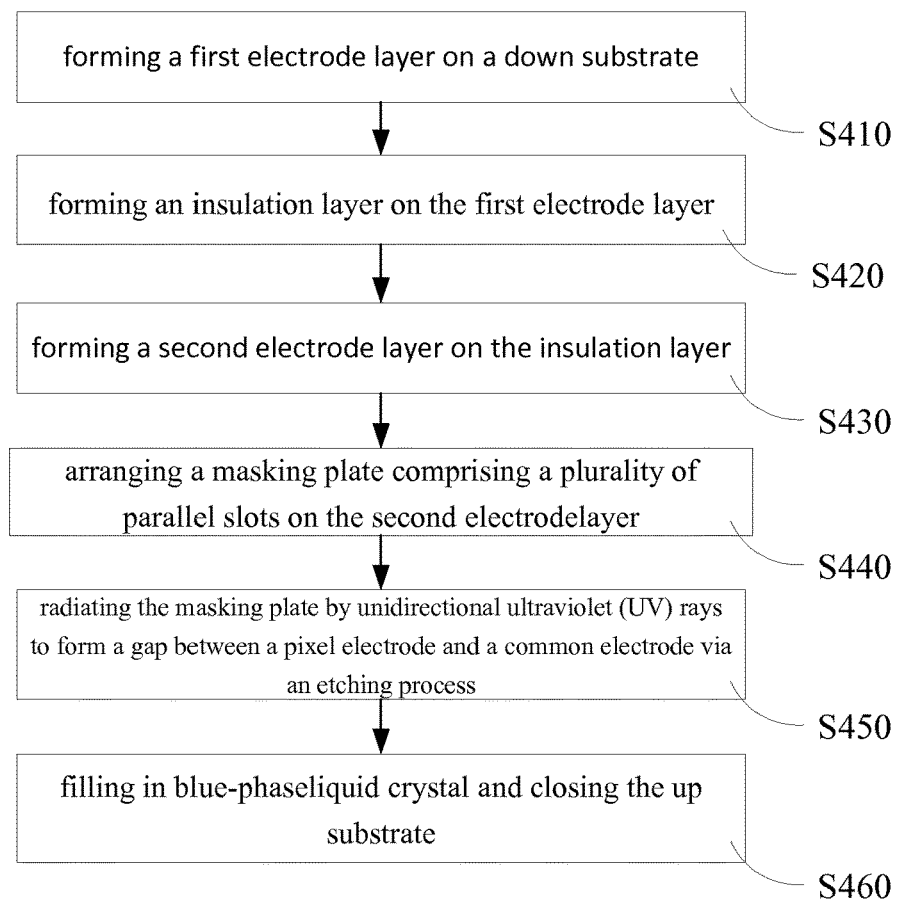
FIG. 10 is a flowchart of the manufacturing method of the blue-phase liquid crystal display module in accordance with one embodiment.

FIG. 10 is a flowchart of the manufacturing method of the blue-phase liquid crystal display module in accordance with one embodiment. The method includes, but not limited to, the following steps.

In block S410, a first electrode layer is formed on the down substrate.

In block S420, the insulation layer is formed on the first electrode layer.

In block S420, the insulation layer may be made by transparent materials, such as transparent photoresist glue, SiNx, SiOx, or Over coating (OC).

Figure 11:
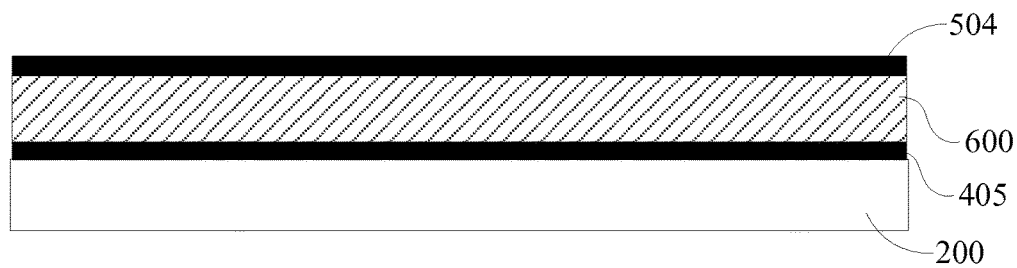
FIG. 11 is a schematic view of the first electrode layer, the insulation layer, and the second electrode layer formed on the down substrate by the manufacturing method of FIG. 10.

In block S430, a second electrode layer is formed on the insulation layer. FIG. 11 is a schematic view of the first electrode layer, the insulation layer, and the second electrode layer formed on the down substrate by the manufacturing method of FIG. 10. In FIG. 11, the reference numeral 200 relates to the down substrate, the reference numeral 405 relates to the first electrode layer, the reference numeral 600 relates to the insulation layer, and the reference numeral 504 relates to the second electrode layer.

In block S440, a masking plate having a plurality of parallel slots is arranged on the second electrode layer.

Before the step of arranging the masking plate on the second electrode layer, the method further includes the step arranging a photoresist layer 605.

In block S450, unidirectional ultraviolet (UV) rays are adopted to radiate the masking plate to form the gap between the pixel electrode and the common electrode via an etching process.

Figure 12:
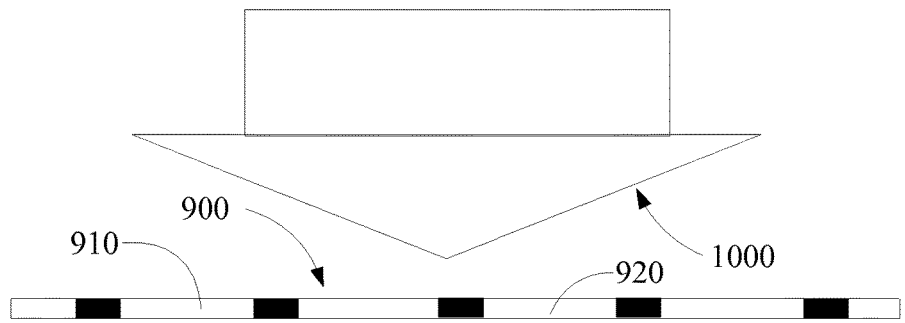
FIG. 12 is a schematic view of the manufacturing method of FIG. 10 etching the gap between the electrodes.
Figure 12:
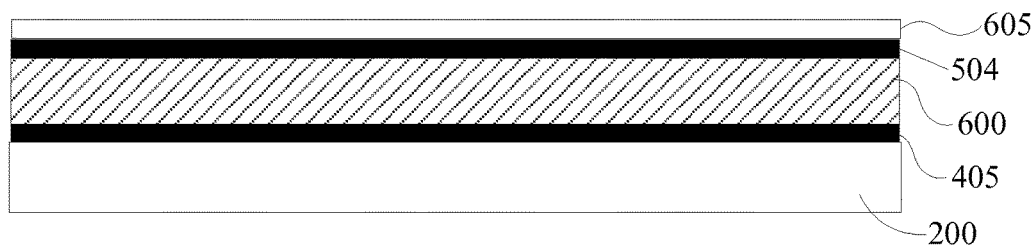
Figure 13:
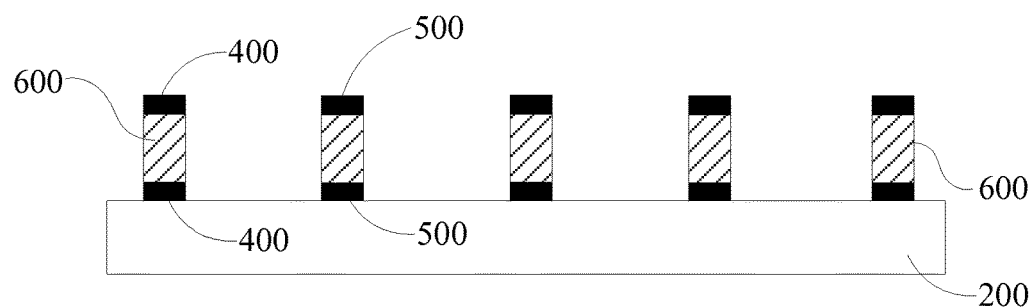
FIG. 13 is a schematic view of the electrodes of FIG. 12 after the etching process.

FIG. 12 is a schematic view of the manufacturing method of FIG. 10 etching the gap between the electrodes. In FIG. 12, the reference numeral 900 relates to the masking plate, the reference numeral 910 relates to a blocking area of the masking plate, the reference numeral 920 relates to the slot area, which is a hollow area. The reference numeral 1000 relates to the UV rays. The UV rays radiate the masking plate vertically, and the electrode layer and the insulation layer within the slot area 920 are etched. The electrode layer and the insulation layer under the blocking area 910 are kept so as to form the structure of FIG. 13. FIG. 13 is a schematic view of the electrodes of FIG. 12 after the etching process. In one example, the electrode and the insulation layer are etched via positive photoresist. At the same time, the electrode and the insulation layer may be etched via negative photoresist. It can be understood that the electrode and the insulation layer may be etched by methods other than positive or negative photoresist. The etching process may be dry or wet etching, which may be conceived by persons skilled in the art, and thus are omitted hereinafter. The reference numeral 400 relates to the pixel electrode, and the reference numeral 500 relates to the common electrode.

In block S550, the blue-phase liquid crystals are filled in and the up substrate is closed.

After block S550, the blue-phase liquid crystal display module, as shown in FIG. 2, is formed. The blue-phase liquid crystal are filled between the up and down substrates, and between the gap between the common electrode and the pixel electrode. The manufacturing method of the blue-phase liquid crystal display module ends.

In addition, the manufacturing method of the blue-phase liquid crystal display module may be formed by the following process. The first electrode layer is formed on the down substrate, the electrode patterns of the first electrode layer are formed by the etching process, the insulation layer and the second electrode layer are formed, the etching process is applied in the end. The principles of the two methods are similar, and only the sequences of the steps are slightly different.

The manufacturing method of the blue-phase liquid crystal display module is simple and easy to implement. With respect to the display module formed by the manufacturing method, the rectangular protrusions are configured with the blue-phase liquid crystal display module, and the up layer and the down layer of the rectangular protrusions are provided with the electrode layers. Preferably, the same electrodes are arranged at the up layer and the down layer of the same protrusions, which may be the pixel electrode or the common electrode. The common electrode and the pixel electrode are spaced apart from each other. The IPS electrical field is formed between the electrodes on the second electrode layer, and two IPS electrical fields are respectively formed at the up and the down surfaces between the electrodes arranged at the up layer, i.e., the pixel electrode and the common electrode. The IPS electrical field is formed on the up surface of the electrode at the down layer, i.e., the first electrode layer. Compared to the conventional structure, the electrode structure is capable of forming three IPS electrical fields to drive the blue-phase liquid crystals to effectively reduce the driving voltage of the blue-phase liquid crystals.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A blue-phase liquid crystal display module, comprising:
   a top substrate;
   a lower substrate opposite to the top substrate, and the lower substrate comprising a transmission area and a reflective area;
   blue-phase liquid crystals arranged between the top substrate and the lower substrate;
   first pixel electrodes, and each of the first pixel electrodes comprising a top pixel electrode layer and a lower pixel electrode layer being separated by a first insulation layer;
   first common electrodes, and each of the common electrodes comprising a top common electrode layer and a lower common electrode layer being separated by a second insulation layer; wherein the first pixel electrodes and the first common electrodes are alternately arranged within the transmission area of the lower substrate, and
   second pixel electrodes and second common electrodes, alternately arranged within the reflective area of the lower substrate, wherein the second pixel electrodes are of a dual-layer structure comprising only one pixel electrode layer stacking on a third insulation layer, and the second common electrodes are of a dual-layer structure comprising only one common electrode layer stacking on a fourth insulation layer;
   a distance between the lower pixel electrode layer and the lower substrate is defined as $d1$, a distance between the lower pixel electrode layer and the top pixel electrode layer is defined as $d2$, and a distance between the top pixel electrode layer and the top substrate is defined as $d3$, wherein $2d1=d2=2d3$.

2. The module as claimed in claim 1, wherein a height of the lower pixel electrode layer of the first pixel electrode and the height of the lower common electrode layer of the first common electrode with respect to the lower substrate are the same.

3. The module as claimed in claim 2, wherein a height of the top pixel electrode layer of the first pixel electrode and the height of the top common electrode layer of the first common electrode with respect to the lower substrate are the same.

4. The module as claimed in claim 1, wherein the pixel electrode layer of the second pixel electrode and the common electrode layer of the second common electrode are respectively stacked on two insulation layers separated by an abandoned electrode layer.

5. The module as claimed in claim 4, wherein the height of the second pixel electrodes is the same with the height of the top pixel electrode layer or the lower pixel electrode layer of the first pixel electrode, and the height of the second common electrodes is the same with the height of the top common electrode layer or the lower common electrode layer of the first common electrode.

6. The module as claimed in claim 5, wherein electrical signals are not applied to the abandoned electrode layer within the reflective area when the module is electrified.

7. The module as claimed in claim 1, wherein a height of the lower pixel electrode layer of the first pixel electrode and the height of the lower common electrode layer of the first common electrode with respect to the lower substrate are the same, and a height of the top pixel electrode layer of the first pixel electrode and the height of the top common electrode layer of the first common electrode with respect to the lower substrate are the same.

8. The module as claimed in claim 1, wherein a thickness of a liquid crystal cell is defined as $h1$, and $d1+d2+d3=2h1$.

9. A blue-phase liquid crystal device (LCD), comprising:
   a blue-phase liquid crystal display module comprising:
   a top substrate;
   a lower substrate opposite to the top substrate, and the lower substrate comprising a transmission area and a reflective area;
   blue-phase liquid crystals arranged between the top substrate and the lower substrate;
   first pixel electrodes, and each of the first pixel electrodes comprising a top pixel electrode layer and a lower pixel electrode layer being separated by a first insulation layer;
   first common electrodes, and each of the common electrodes comprising a top common electrode layer and a lower common electrode layer being separated by a second insulation layer; wherein the first pixel electrodes and the first common electrodes are alternately arranged within the transmission area of the lower substrate, and
   second pixel electrodes and second common electrodes, alternately arranged within the reflective area of the lower substrate, wherein the second pixel electrodes are of a dual-layer structure comprising only one pixel electrode layer stacking on a third insulation layer, and the second common electrodes are of a dual-layer structure comprising only one common electrode layer stacking on a fourth insulation layer;
   a distance between the lower pixel electrode layer and the lower substrate is defined as $d1$, a distance between the lower pixel electrode layer and the top pixel electrode layer is defined as $d2$, and a distance between the top pixel electrode layer and the top substrate is defined as $d3$, wherein $2d1=d2=2d3$.

10. The device as claimed in claim 9, wherein a height of the lower pixel electrode layer of the first pixel electrode and the height of the lower common electrode layer of the first common electrode with respect to the lower substrate are the same.

11. The device as claimed in claim 10, wherein a height of the top pixel electrode layer of the first pixel electrode and the height of the top common electrode layer of the first common electrode with respect to the lower substrate are the same.

12. The device as claimed in claim 9, wherein the pixel electrode layer of the second pixel electrode and the common electrode layer of the second common electrode are respectively stacked on two insulation layers separated by an abandoned electrode layer.

13. The device as claimed in claim 12, wherein the height of the second pixel electrodes is the same with the height of the top pixel electrode layer or the lower pixel electrode layer of the first pixel electrode, and the height of the second common electrodes is the same with the height of the top common electrode layer or the lower common electrode layer of the first common electrode.

14. The device as claimed in claim 13, wherein electrical signals are not applied to the abandoned electrode layer within the reflective area when the module is electrified.

15. The module as claimed in claim 9, wherein a height of the lower pixel electrode layer of the first pixel electrode and the height of the lower common electrode layer of the first common electrode with respect to the lower substrate are the same, and a height of the top pixel electrode layer of the first pixel electrode and the height of the top common electrode layer of the first common electrode with respect to the lower substrate are the same.

16. The module as claimed in claim 9, wherein a thickness of a liquid crystal cell is defined as $h1$, and $d1+d2+d3=2h1$.

* * * * *